US010908885B2

(12) United States Patent
Ducore et al.

(10) Patent No.: US 10,908,885 B2
(45) Date of Patent: Feb. 2, 2021

(54) QUANTUM COMPILER

(71) Applicant: IonQ, Inc., College Park, MD (US)

(72) Inventors: Andrew Maps Ducore, Bethesda, MD (US); Omar Shehab, Hyattsville, MD (US); Matthew Joseph Keesan, Washington, DC (US)

(73) Assignee: IonQ, Inc., College Park, MD (US)

( * ) Notice: Subject to any disclaimer, the term of this patent is extended or adjusted under 35 U.S.C. 154(b) by 0 days.

(21) Appl. No.: 16/437,212

(22) Filed: Jun. 11, 2019

(65) Prior Publication Data

US 2020/0394027 A1 Dec. 17, 2020

(51) Int. Cl.
*G06F 8/41* (2018.01)
*G06N 10/00* (2019.01)

(52) U.S. Cl.
CPC .............. *G06F 8/427* (2013.01); *G06F 8/437* (2013.01); *G06N 10/00* (2019.01)

(58) Field of Classification Search
CPC ........................ G06F 8/41–437; G06N 10/00
USPC ........................................................ 717/143
See application file for complete search history.

(56) References Cited

U.S. PATENT DOCUMENTS

| | | | |
|---|---|---|---|
| 6,456,994 B1* | 9/2002 | Tucci ..................... | B82Y 10/00 706/52 |
| 9,639,335 B2* | 5/2017 | Hoban ..................... | G06F 8/437 |
| 9,652,207 B2* | 5/2017 | Hoban ..................... | G06F 8/437 |
| 10,031,791 B1* | 7/2018 | Wallman ................ | G06N 10/00 |
| 10,223,084 B1* | 3/2019 | Dunn ....................... | G06N 10/00 |
| 10,268,843 B2* | 4/2019 | Fiske ....................... | G06F 21/75 |
| 10,402,743 B1* | 9/2019 | Rigetti .................... | G06F 15/16 |
| 2016/0011857 A1* | 1/2016 | Grover .................. | G06F 8/4443 717/148 |
| 2016/0171368 A1* | 6/2016 | Aspuru-Guzik ....... | G06N 5/003 706/46 |
| 2016/0350085 A1* | 12/2016 | Horie ...................... | G06F 8/427 |
| 2017/0147303 A1* | 5/2017 | Amy ........................ | G06F 8/44 |
| 2017/0308803 A1* | 10/2017 | Wallman ................ | G06N 10/00 |
| 2018/0260198 A1* | 9/2018 | Hamby .................... | G06F 8/42 |
| 2019/0073228 A1* | 3/2019 | Stanfill .................... | G06F 8/34 |
| 2019/0095561 A1* | 3/2019 | Pednault ................. | G06F 30/33 |
| 2019/0095566 A1* | 3/2019 | Denisenko ............ | G06F 30/327 |
| 2019/0121921 A1* | 4/2019 | Nam ...................... | G06F 30/327 |
| 2019/0164076 A1* | 5/2019 | Kim ........................ | G06F 8/425 |
| 2019/0171963 A1* | 6/2019 | van Rooyen .......... | G16B 50/00 |
| 2019/0235892 A1* | 8/2019 | Schkufza .............. | G06F 9/4552 |

(Continued)

OTHER PUBLICATIONS

Jonathan Richard Robert Kimmitt; "A Type-Safe Apparatus Executing Higher Order Functions in Conjunction With Hardware Error Tolerance"; Anglia Ruskin University, in collaboration with The University of Cambridge—Oct. 2015.*

*Primary Examiner* — Francisco J Aponte

(74) *Attorney, Agent, or Firm* — Brundidge & Stanger, P.C.

(57) ABSTRACT

Technologies are described herein to compile a Turing-complete quantum programming language program into a quantum circuit. The techniques described and recited herein include compiling TCQPL source code to generate a quantum circuit by generating a function object ensemble, generating an abstract syntax tree from received source code, and annotating nodes corresponding to the abstract syntax tree with corresponding function objects.

18 Claims, 4 Drawing Sheets

(56) References Cited

U.S. PATENT DOCUMENTS

2019/0258757 A1* 8/2019 Nam .................. G06F 30/20
2019/0378047 A1* 12/2019 Pistoia ................ G06F 17/14

* cited by examiner

120

QUANTUM COMPILER

TECHNICAL FIELD

The embodiments described herein pertain generally to compiling programs.

BACKGROUND

Large-scale quantum computers can solve certain problems much more quickly than digital computers, which may be alternatively referred to herein as "classical computers." In the operation of a quantum computer, computations may be initialized by setting quantum bits and classical bits, or qubits, in a controlled initial state. By manipulating those qubits, predetermined sequences of quantum logic gates are realized that represent a solution to the problem to be solved. Quantum algorithms, such as Shor's algorithm, Simon's algorithm, etc., run more efficiently than any possible classical algorithm.

Based on the inherent advantages in quantum computers in solving certain problems, the challenge is in programming for quantum computers to take advantage of their strengths in an efficient and cost-effective manner.

SUMMARY

In one example embodiment, a computer-readable medium stores executable instructions that cause a digital computing processor to compile source code to generate a quantum circuit by generating a function object ensemble, generating an abstract syntax tree from received source code, and annotating nodes corresponding to the abstract syntax tree with corresponding function objects.

In another example embodiment, a digital processor has a compiler that loads to memory function objects corresponding, respectively, to all potential nodes of a parse tree, receives source code, generates a parse tree from the received source code, and annotates nodes of the generated parse tree with corresponding function objects. The digital processor also has a runtime to execute the annotated nodes of the parse tree.

In yet another example embodiment, a compiling method includes a compiler loading function objects into memory, receiving source code, loading compiler plugins, generating a parse tree based on each statement included in the received source code, resolving imported statements, hoisting the source code, and annotating the generated parse tree by binding respective function objects loaded into memory to a corresponding node of the parse tree.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
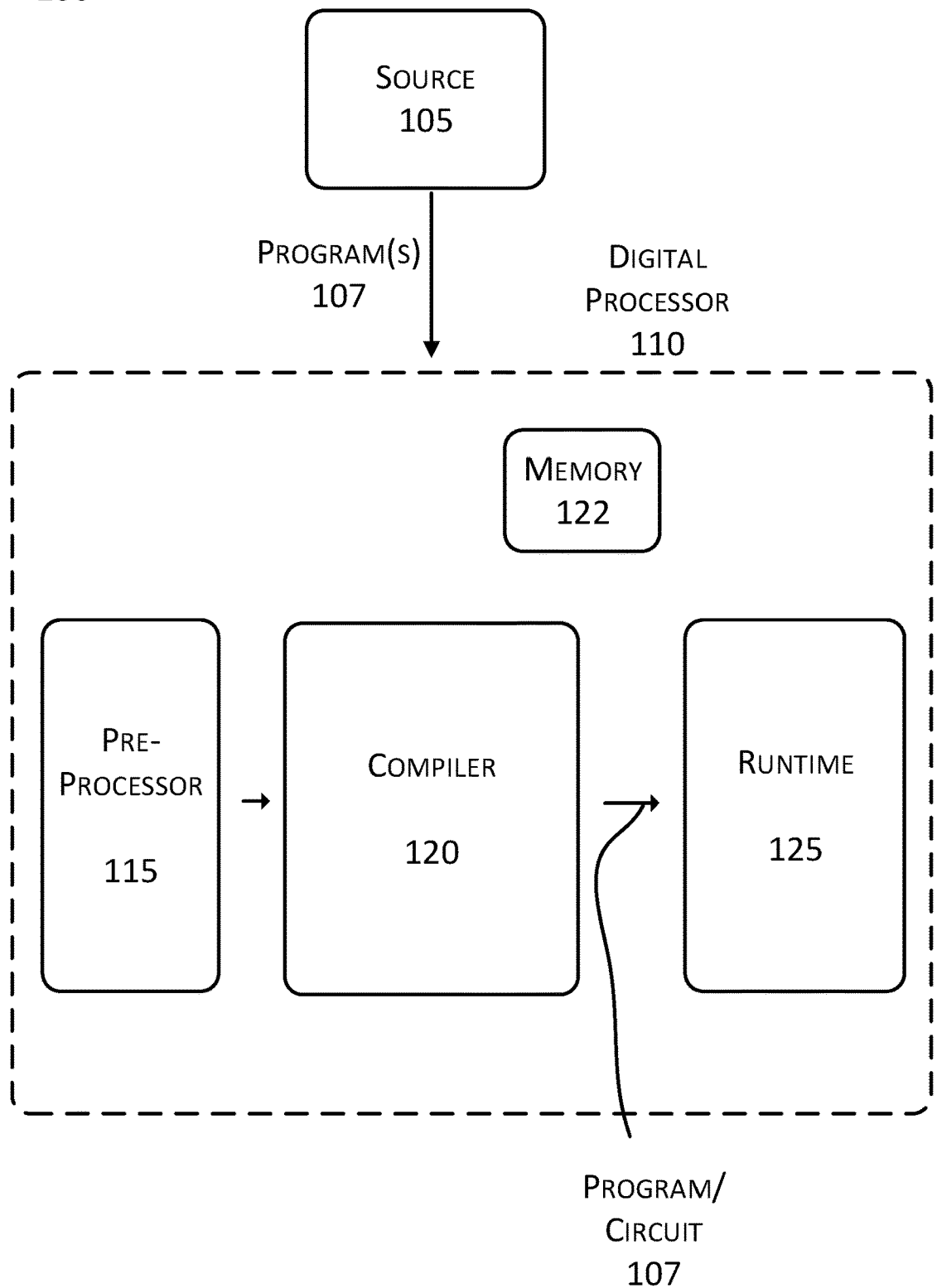
FIG. 1 shows a block diagram representing an example digital computer by which source code is compiled into a quantum circuit or classical executables, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In the present description and recitation, the following terms may be used, in addition to their accepted meaning, as follows:

A quantum computer is a computational system that uses quantum-mechanical phenomena, such as superposition, entanglement, and measurement, to process data. Unlike classical computers, in which data is encoded into binary digits (bits) in one of two definite states ("0" or "1"), quantum computation requires that data be encoded into binary digits and quantum bits, i.e., qubits, for which a single qubit may represent a "1," a "0," or any quantum superposition of the two qubit states. In general, a quantum computer with N qubits may be in an arbitrary superposition of up to 2 different states simultaneously, e.g., a pair of qubits may be in any quantum superposition of four states, and three qubits may be in any superposition of eight states. Accordingly, as referenced herein, a "bit" may refer to a unit of encoding classical information, and a "qubit" may refer to a unit of encoding quantum information.

"Classical computing," "classical program," "digital computing," "digital program," or variations thereof may refer to computing/processing of data that has been converted into binary numbers. Classical computing processors may include, but not be limited to, a central processing unit (CPU), a graphical processing unit (GPU), a tensor processing unit (TPU), application-specific integrated circuits (ASICs), field programmable gate arrays, etc., and unbound permutations thereof. Non-limiting examples thereof may include a classical optimization function that may be parallelized and run on a multicore classical computer, a classical computer with a GPU for performing parallel calculations, etc.

"Quantum computing," or variations thereof, may refer to computing/processing of data that has been encoded into qubits. Quantum computing utilizes qubits to perform computations to produce results that may be dramatically faster than classical computing or make classically computationally intractable problems tractable. The embodiments described herein contemplate implementation in even faster and more efficient quantum computing systems as technologies evolve.

"Environment" may refer to a computing environment in which are found components that, when executing a program, may utilize, e.g., utilities such as libraries, other programs, other hardware, etc. Thus, reference may be made herein to a classical computing environment, a quantum computing environment, etc.

A "quantum gate" may refer to a controlled operation that manipulates the state and/or phase of qubits in a quantum computing system, thus changing the information content of the quantum computing system.

A "circuit" may refer to quantum function included in a program, more particularly a time-ordered list of quantum gate operations that act on a set of qubits or bits. The name historically comes from quantum algorithms being expressed as a series of quantum logic gates, analogous to classical logic gates in traditional circuit design.

The embodiments described and recited herein pertain to a compiler for a Turing-complete quantum programming language (TCQPL), which is a hybrid programming language that is classically Turing-complete and includes native quantum primitives to execute programs on a Quantum Random Access Memory (QRAM) architecture.

A TCQPL may be regarded as a programming language by which programs for a QRAM architecture may be written. A TCQPL may require the capability of writing general classical programs and generating quantum circuit description for a practical quantum computer. Described and recited herein are methods, programs, systems, apparatuses, and components pertaining to the compilation of a Turing-complete quantum programming language.

Quantum information processing (QIP) algorithms may be represented using quantum circuits. Abstract gate operations have been utilized for the design and construction of QIP algorithms which, when implemented at a physical level, must be compiled into a set of hardware-specific operations that manipulate qubit states. Within this context, a logical gate may refer to an abstract, design-oriented operation, whereas a physical gate may refer to a hardware-specific implementation.

The process by which logical gates are mapped to physical gates may be referred to as the compiler step or compilation.

Further, in a TCQPL context, a qubit may be regarded as a data type that stores a reference to a physical or logical qubit. The reference may be a high-level relative storage address or a fully qualified absolute storage address. An array of type qubit may be used to store the reference to a quantum register. In one or more embodiments of a TCQPL compiler, as described and recited herein, the address of a qubit may be stored inside a data structure. Data structures may be selected using two different approaches.

In a centralized approach, a complex data structure stores and manages all qubit addresses for a program; and in a distributed approach, the qubit addresses are stored with the metadata of a qubit variable, with address data being stored as either absolute or relative addresses.

In a relative addressing scheme, when a qubit variable is created by assigning the value from an already existing qubit variable, the address of the qubit variable being referenced may be tracked; and in a fully qualified absolute addressing scheme, the compiler and runtime will resolve a chain of references up to the qubit variable that has been created explicitly and store the chain of references in the address table.

Further, in a TCQPL context, a circuit may be regarded as a data type that stores a logical representation of a quantum circuit. A directed acyclic graph (DAG) is an example of an internal data structure used to store the quantum circuit information. A circuit type may receive classical bits, qubits, and/or numerical parameters as input, and, typically, real parameters are rotation angles in radians. A circuit takes parameters facilitate reusable code.

A sequence may be regarded as a block of quantum and classical statements, like a classical function, that returns a circuit type. A sequence may take both qubit and classical data types as input.

A parse tree may be regarded as a data structure created based on the grammar of the TCQPL that is used to validate a given block of TCQPL code. The output of a syntactic validation process is an unannotated parse tree, whereas an annotated parse tree is produced upon the compiler annotating the nodes of the parse tree with additional items during the lifecycle of the TCQPL program.

A compiler workflow includes operational and derotational semantics validation. Operational semantics validation includes validating the organization and control flow of the TCQPL program; and derotational semantics validation includes validating the mathematical meaning of program statements. Thus, once the unannotated parse tree undergoes multiple layers of operational and derotational semantic validation processes, each node in the parse tree may be annotated with a corresponding function object, which may be run to execute the node. At this stage, the parse tree becomes an annotated parse tree, and may be executed.

A function object may be regarded as a function implemented in the language in which the compiler is written. Further, respective function objects may be associated with each node of an annotated parse tree, as set forth above and described in more detail below; and running a function object may be equivalent to the execution of the statement implied by the corresponding node.

Generally, the features of a programming language may be implemented as part of language syntax, and libraries may be developed to provide specialized features. The functionality of features implemented in a programming language other than the language in which the compiler is written may be exposed via plugins. As a non-limiting example, a compiler may be written in JavaScript; while, again as a non-limiting example a chemistry plugin may be written in Fortran, thus a plugin allows the programmer to use the functionality of the compiled Fortran code. Alternatively, again as a non-limiting implementation, plug-ins may include a separate file, e.g., collection of functions, that may be stored in memory to imported into a compiled program. In this scenario, plugins may or may not be written in the language of the compiled program, but the plugins should be capable of interacting with the compiled program.

Further pertinent data structures may include a scope resolution table. For every identifier in the TCQPL source code, an entry may be made into the scope resolution table that defines its scope, as understood in compiler design. It is noted that every scope other than the top scope has a parent scope.

In addition, a TCQPL program may include circuit accumulators to build circuits. A circuit accumulator may be explicit or implicit, though a TCQPL program has one implicit accumulator at a time. Circuits created by explicit accumulators may be executed explicitly by the programmer, and a garbage collector may clean up the memory allocation once the execution has been completed. On the other hand, a circuit built by the implicit accumulator may be automatically executed at the end of the program, and a stack in the compiler memory, e.g., accumulator stack, may track a currently active accumulator, ready to accept the next gate encountered by the parser.

As set forth above, described and recited herein are methods, programs, systems, apparatuses, and components pertaining to the compilation of a Turing-complete quantum programming language, of which there are no known equivalents for practical quantum computers.

FIG. 1 shows a block diagram representing an example digital computer by which source code may be compiled into a quantum circuit, arranged in accordance with at least some embodiments described herein. As depicted, configuration 100 includes at least a program source 105, program(s) 107, and digital processor 110. Digital processor 110 may include, at least, pre-processor 115, compiler 120, memory 122, and runtime environment 125.

Source 105 may refer to one or one of multiple servers, on the order of hundreds to thousands, that may be hosted on a cloud-based infrastructure via which program(s) 107 may be received from a user or user entity over a network. Source 105 may be further configured to receive and/or store partial or complete results of the execution of program(s) 107 and return such results to the user or user entity, also via the network. Further, source 105 may be implemented by single or multiple classical computers, and program(s) 107 may be transmitted across single or multiple connections or channels.

Program(s) 107 may refer to one or more programs received from a user or user entity, via source 105. Program(s) 107 may include at least one or more quantum circuits written or programmed in a classical environment intended for execution in a quantum computing environment. Respective ones of program(s) 107 may be written or programmed in-part or entirely in a quantum computing language, e.g., a TCQPL, and include only quantum circuits, or include quantum circuits in combination with classical computing functions. Unless context otherwise requires, the present description and recitation will continue with reference to a single embodiment of program 107, but without excluding embodiments and implementations that include multiple programs.

Program 107 may be regarded as a collection of bits and qubits, i.e., gates, having a series of instructions on the respective bits and qubits. Further, as previously referenced, program 107 may include multiple circuits that are collectively composed into a single quantum program; and tracking information storage resources in a quantum circuit, as disclosed and recited herein, includes correlating bits and qubits from one circuit to another.

As further context, in quantum programming, but not necessarily in classical programming, program 107 is written to generate another program. That is, the first program describes the second program, and includes instructions for how to write, or synthesize, one or more quantum circuits. These generated quantum circuits may be constructed via a process in which the first program creates multiple smaller quantum programs and then issues instructions to combine these multiple smaller programs by adding them into a larger quantum circuit.

In at least some embodiments, program 107 may be written in a TCQPL, thus facilitating the writing of general classical programs to generate quantum circuit descriptions for a practical quantum computer. Thus, as previously referenced, embodiments described and recited herein pertain to methods, programs, systems, apparatuses, and components pertaining to the compilation of a TCQPL program.

Digital processor 110 may refer to one or more embodiments of a classical computing environment that may be, or include, a classical computer, processing device, a microprocessor, a microcontroller, a digital signal processor, or any combination thereof, on which program 107 is assembled, managed, compiled, and/or executed. Digital processor 110 may refer to a high-performance computing (HPC) environment that includes, at least, a CPU and GPU that is present on a, e.g., a video card, embedded on a motherboard, or on the CPU die. Tracking of references to information storage resources in a quantum circuit, according to embodiments described herein, may be executed entirely on the CPU or in part on the CPU and the GPU. Alternative embodiments may be executed in evolved HPC components equivalent to those described herein.

Pre-processor 115 may refer to a program that is designed, programmed, or otherwise configured to modify input data to conform h input requirements of another program. In accordance with the embodiments described herein, the input to pre-processor 115 includes at least portions of program 107, which may include one or more quantum circuits. The output may be referred to as a preprocessed form of the input data, i.e., program 107, that may be used or executed by other programs on digital processor 110. In accordance with the embodiments described herein, pre-processor 115 may pre-process or otherwise translate the source code, e.g., TCQPL, by which program 107 is written in preparation for compilation.

Compiler 120 may refer to a compiler that is designed, programmed, or otherwise configured to render at least portions of program 107 suitable for execution in a quantum environment. Compiler 120 may execute operations that promote efficient and flexible design of source input to target output.

In accordance with at least some embodiments described herein, compiler 120 may be designed, programmed, or otherwise configured, in part, to generate a function object ensemble for the language of the source used to program a quantum circuit to be compiled; generate an abstract syntax tree, i.e., a parse tree, from received source code; and annotate nodes of the abstract syntax tree with respective function objects. Thus, compiler 120 facilitates compilation of a flexible quantum circuit by which operations are executed independently and, by some implementations, in variable order, as will be described further herein.

Memory 122 may refer to computer data storage, associated with digital processor 110, that is designed, programmed, or otherwise configured to receive program store data and machine code for program 107. As a non-limiting example, memory 122 may refer to a random-access memory (RAM) that stores, among other data, function objects corresponding to the language, e.g., JavaScript, for use in executing program 107. Collectively, the function objects may be referred to as a function object ensemble and may include functions for every defined feature in the language of the source code. Memory 122 may also store source code plugins that are received, e.g., as one or more separate files that include one or more collections of functions that may be imported into program 107.

Runtime 125 may refer to the runtime environment (RTE) for program 107. Runtime 125 may be designed, programmed, or otherwise configured to, e.g., access system resources such as memory 122, send instructions or commands to other system resources, etc. That is, runtime 125 provides a state for digital processor 110 to access resources to provide services and support for processes involved in execution of program 107.

In accordance with some embodiments described herein, runtime 125 may be designed, programmed, or otherwise configured, in part, to execute compiled program 107, as received from compiler 120. More particularly, runtime 125 may independently execute the functions objects annotated to each node of the parse tree.

Compiled program 107 includes one or more quantum circuits, which invariably includes complex structures or patterns, including an abstract syntax tree, i.e., parse tree, that has myriad nodes, each of which has a corresponding function object assigned thereto. Since runtime 125 may execute each function object independent of all others, compiler 120 advantageously produces a compiled quantum circuit that is flexible in composition and execution. For example, a part of the source code may synthesize a quantum circuit, which may be re-used as a sub-circuit in more than one location.

As time or contextual references, "compile time" may refer to the stage of life cycle of program 107 when source code is translated to an immediate proceeding representation; and "runtime" may refer to the stage of life cycle of program 107 when the computational work defined by the source code is performed by processor 110.

Figure 2:
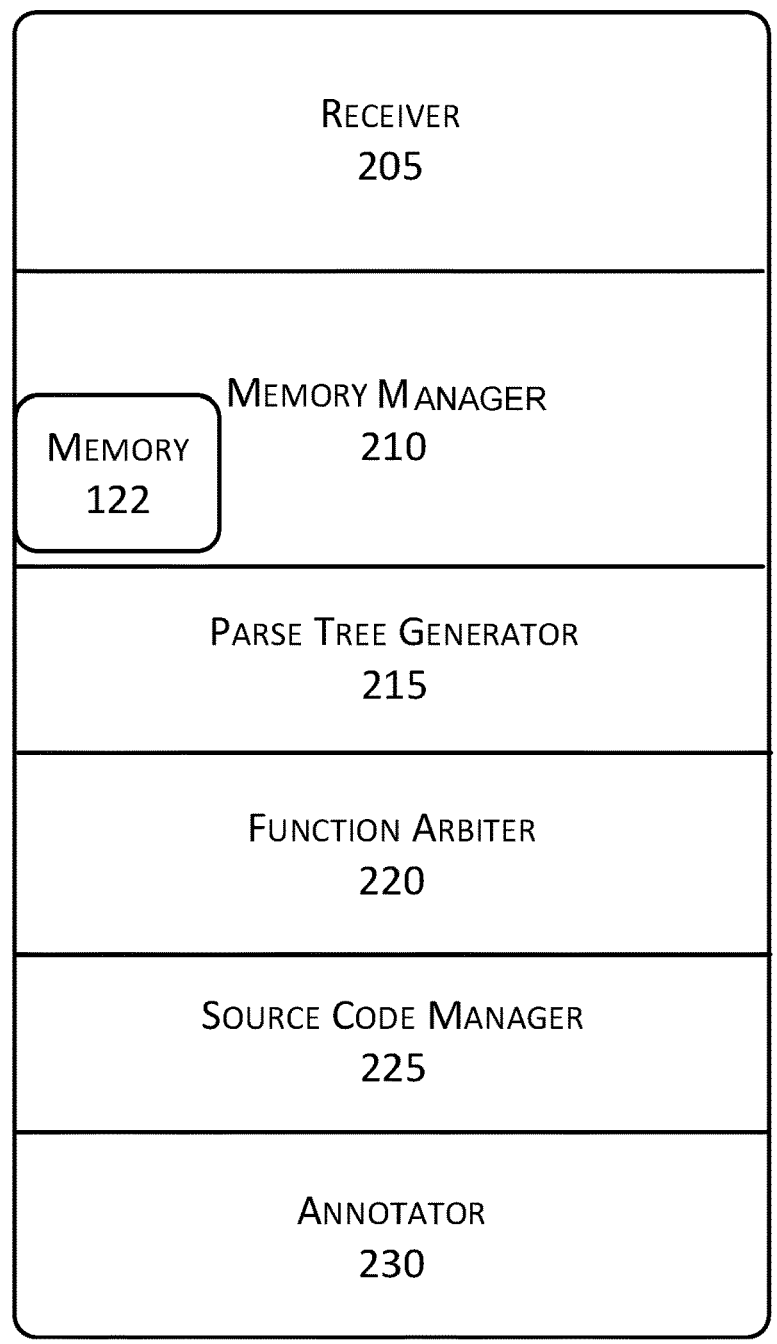
FIG. 2 shows a block diagram representing an example quantum compiler, arranged in accordance with at least some embodiments described herein.

FIG. 2 shows a block diagram representing an example quantum compiler 120, arranged in accordance with at least some embodiments described herein. As depicted, quantum compiler 120 includes at least receiver 205, memory manager 210, parse tree generator 215, function arbiter 220, source code manager 225, and annotator 230. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Receiver 205 may be designed, configured, or otherwise programmed to receive program 107, which is written or programmed in a classical environment, e.g., in TCQPL source code, intended for execution in a quantum computing environment. That is, compiled program 107 includes one or more quantum circuits.

Memory manager 210 may be designed, configured, or otherwise programmed to manage memory 122. In accordance with at least some example embodiments, memory manager 210 may load function objects corresponding, respectively, to source code, e.g., TCQPL, for program 107. The data loaded to memory 122 may include, as non-limiting examples, the function object ensemble for the language for program 107, with the ensemble being created for all nodes that a parse tree for the source code could possibly have. Memory manager 210 may also load to memory 122 source code plugins that are received, e.g., as one or more separate files that include one or more collections of functions that may be imported into program 107.

Parse tree generator 215 may be designed, configured, or otherwise programmed to generate an abstract syntax tree, i.e., a parse tree, using known implementations. The generated parse tree is to include nodes to which of the singular objects of the functions of program 107 may be loaded, i.e., annotated. That is, parse tree generator may create a parse tree from, e.g., TCQPL source code using either an LL(*) or (G)LR (including variants) parsing algorithms. LL parsers analyze manually, using left-to-right, leftmost derivation, are not restricted to a finite number of tokens of lookahead; while an LR parser is an extension of an LR parser algorithm, using a left-to-right and rightmost derivation, for handling non-deterministic and ambiguous grammar, i.e., an LR parser accepts a richer set of grammars. The output is always a parse tree.

Function arbiter 220 may be designed, configured, or otherwise programmed to map the function objects to the nodes of the parse tree. These function objects may then be attached to corresponding nodes as metadata.

Source code manager 225 may be designed, configured, or otherwise programmed to resolve imported statements. Accordingly, source code manager 225 implements a recursive process to compile programs that may be nested within any imported statements. That is, if program 107 includes imported libraries, source code manager 225 may resolve scope. Accordingly, parse tree generator 215 may create a separate parse tree for each imported source file written in the source code.

Source code manager 225 may be further designed, configured, or otherwise programmed to hoist source code. That is, function declarations may be hoisted, i.e., moved to the top of the source code of program 107. Further, source code manager 225 may resolve compile time constants, and update a scope resolution table. Accordingly, because functions are hoisted, a programmer may have the flexibility to define the respective functions at any point in program 107.

Annotator 230 may be designed, configured, or otherwise programmed to perform static and dynamic analysis to validate operational and denotational semantics of the source code of program 107. Annotator 230 may bind a type of each node of the parse tree; and, therefore, when the binding is validated, each node is bound to the corresponding function object that was created upon launch of compiler 120. Accordingly, compiler 120 has annotated the parse tree, which is then in condition for execution.

Figure 3:
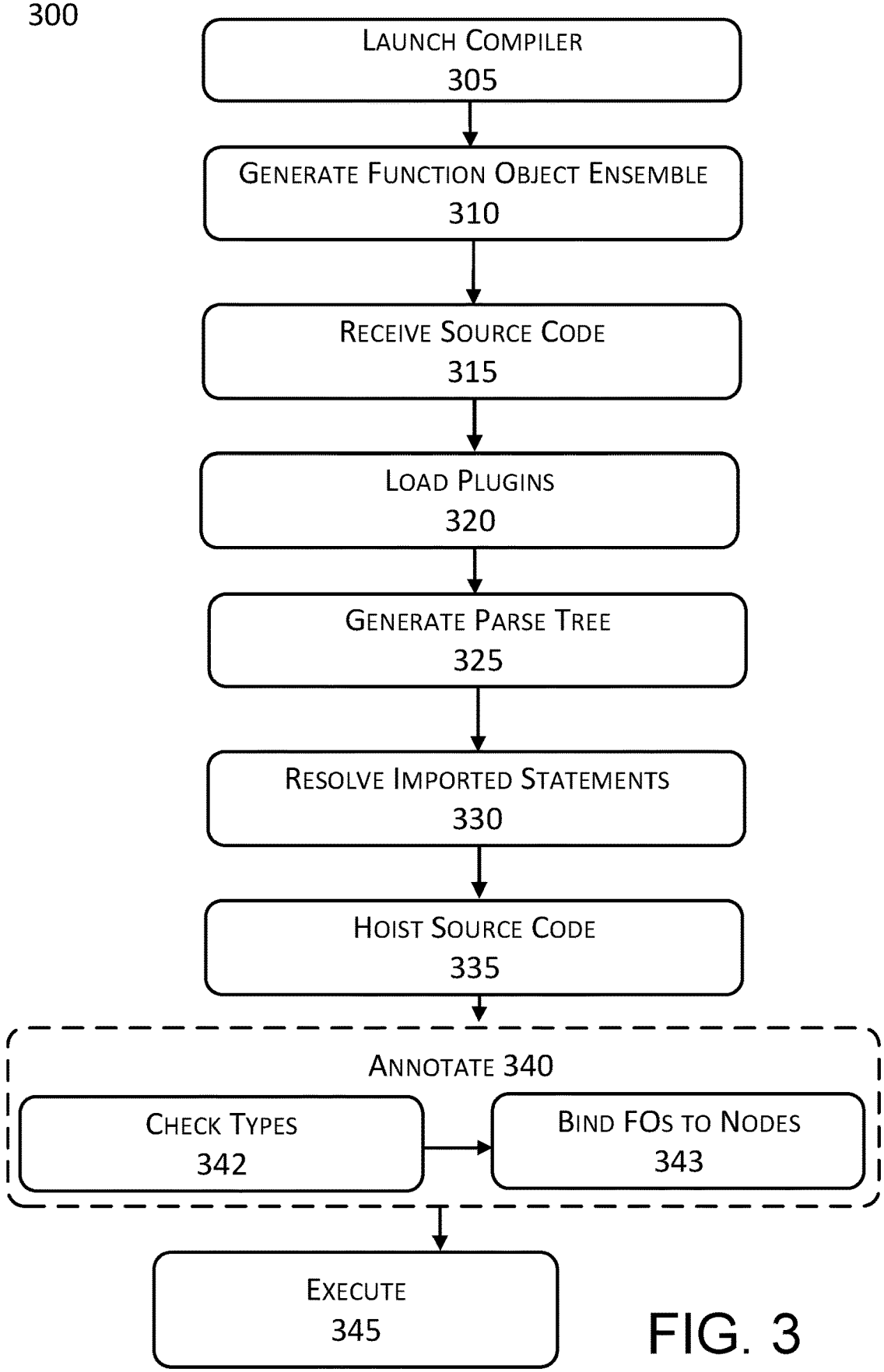
FIG. 3 shows an example processing flow for compiling source code into a quantum circuit, in accordance with at least some embodiments described herein.

FIG. 3 shows an example processing flow for compiling source code into a quantum circuit, in accordance with at least some embodiments described herein. As depicted, processing flow 300 includes sub-processes executed by various components of compiler 120 that may be included in digital processor 110. However, processing flow 300 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 305, 310, 315, 320, 325, 330, 335, 340 (including 342 and 343), and 345. These various operations, functions, or actions may, for example, correspond to software, program code, or program instructions executable by a digital processor that causes the functions to be performed. Processing may begin at block 305.

At block 305 (Launch Compiler), compiler 120 may be launched, which may occur when program 107 written in TCQPL source code is received from pre-processor 115. Before the TCQPL source code is accepted for compilation, compiler 120 effectively prepares itself. Thus, processing may proceed from block 305 to block 310.

At block 310 (Generate Function Object Ensemble), memory manager 210 may load function objects corresponding to program data and machine code for program 107. The data loaded to memory 122 may include, as non-limiting examples, a function ensemble for the language in which compiler 120 is written, e.g., JavaScript, with the ensemble being created for all nodes that a parse tree for the source code could possibly have. Processing may proceed from block 310 to block 315.

At block 315 (Receive Source Code), compiler 120 may receive program 107, e.g., TCQPL source code, as a text string from pre-processor 115. Processing may proceed from block 3105 to block 320.

At block 320 (Load Plugins), memory manager 210 may also load to memory 122 source code plugins that are received, e.g., as one or more separate files that include one or more collections of functions that may be imported into program 107. That is, the functionality of program 107 may be extended with plugins, thus all plugins corresponding to digital processor 110 may be loaded in the program space upon launching of compiler 120. Processing may proceed from block 320 to block 325.

At block 325 (Generate Parse Tree), parse tree generator 215 may break down the functions of program 107 into function objects to generate an abstract syntax tree, i.e., a parse tree; using known implementations. The generated parse tree is to include nodes to which of the objects of the functions of program 107 may be loaded, i.e., annotated. Function arbiter 220 may map the function objects to the nodes of the parse tree. That is, parse tree generator 215 may create a parse tree from, e.g., TCQPL source code using either an LL(*) or (G)LR (including variants) parsing algorithms. Processing may proceed from block 325 to block 330.

At block 330 (Resolve Imported Statements), source code manager 225 may implement a recursive process to compile programs that may be nested within any imported statements. That is, source code manager 225 may resolve the scope for any imported libraries corresponding to program 107; and, therefore, parse tree generator 220 creates a separate parse tree for each imported source file written in the source code. Processing may proceed from block 330 to block 335.

At block 335 (Hoist Source Code), source code manager 225 may be further designed, configured, or otherwise programmed to hoist source code. That is, function declarations may be hoisted, i.e., moved to the top of the source code of program 107. Further, source code manager 225 may resolve compile time constants, and update a scope resolution table. Accordingly, because functions are hoisted, a programmer may have the flexibility to define the respective functions at any point in program 107. Processing may proceed from block 335 to block 340.

At block 340 (Annotate), annotator 230 may traverse the parse tree to perform static and dynamic analysis to create a type-checked parse tree (sub-block 342 (Check Types)), that is, validate operational and denotational semantics of the source code of program 107; and, for each node bind a corresponding function object from the function object ensemble (sub-block 343 (Bind FOs to Nodes)).

Upon completion of processing of block 340, compiler 120 has annotated the parse tree, which is in condition for execution.

Figure 4:
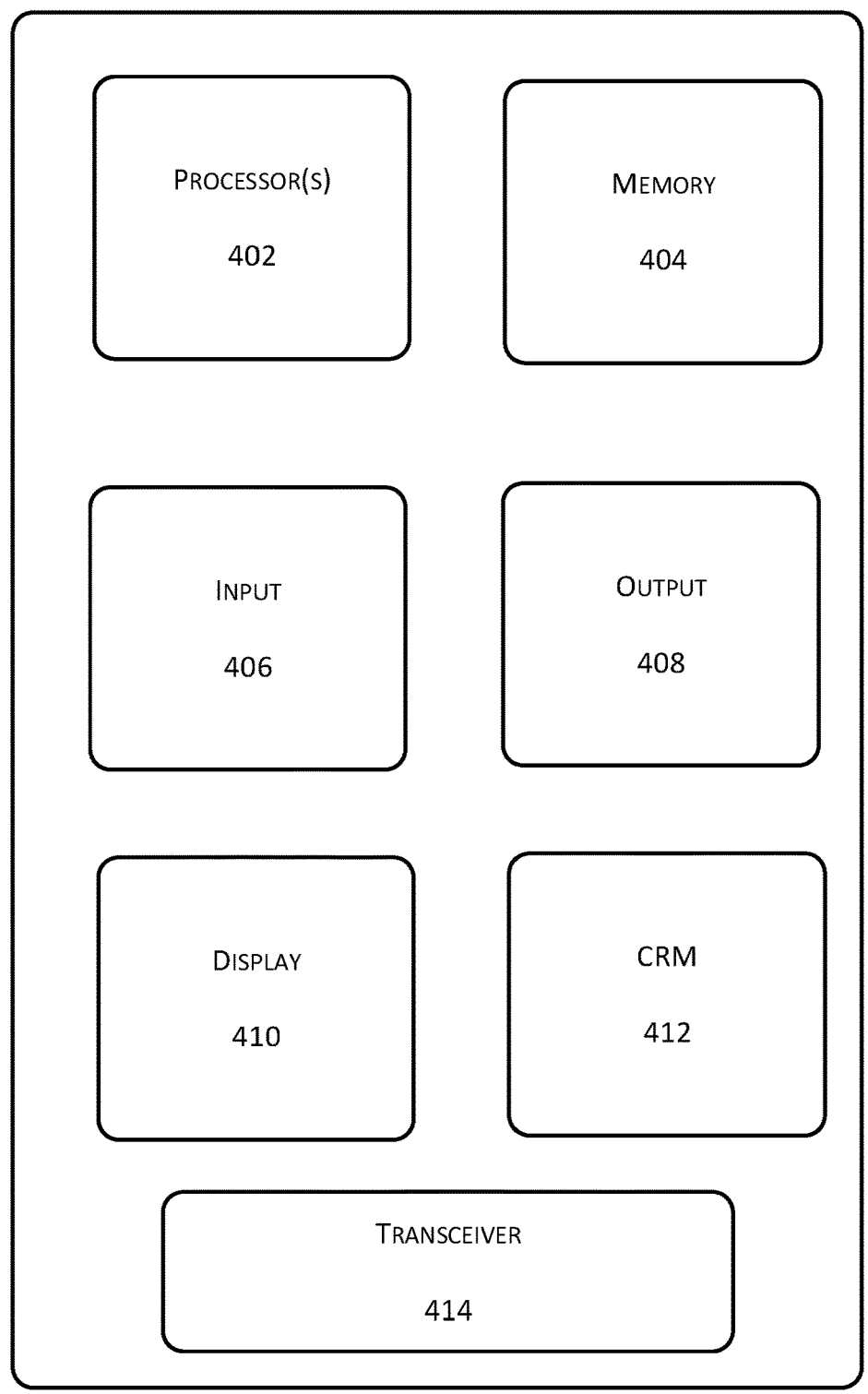
FIG. 4 shows an illustrative computing embodiment, in which any of the processes and sub-processes of optimizing a quantum circuit may be implemented as executable instructions stored on a computer-readable medium.

FIG. 4 shows an illustrative computing embodiment, in which any of the processes and sub-processes of compiling a quantum circuit may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to systems 100 and 200 for quantum hybrid computation.

In a very basic configuration, a computing device 400 may typically include, at least, one or more processors 402, a system memory 404, one or more input components 406, one or more output components 408, a display component 410, a computer-readable medium 412, and a transceiver 414.

Processor 402 may refer to, e.g., a microprocessor, a microcontroller, a digital signal processor, or any combination thereof, akin to digital processor 110 described in accordance with FIG. 1.

Memory 404 may refer to, e.g., a volatile memory, non-volatile memory, or any combination thereof. Memory 404 may store, therein, operating system 130, an application, and/or program data. That is, memory 404 may store executable instructions to implement any of the functions or operations described above and, therefore, memory 404 may be regarded as a computer-readable medium.

Input component 406 may refer to a built-in or communicatively coupled keyboard, touch screen, or telecommunication device. Alternatively, input component 406 may include a microphone that is configured, in cooperation with a voice-recognition program that may be stored in memory 404, to receive voice commands from a user of computing device 400. Further, input component 406, if not built-in to computing device 400, may be communicatively coupled thereto via short-range communication protocols including, but not limitation, radio frequency or Bluetooth.

Output component 408 may refer to a component or module, built-in or removable from computing device 400, that is configured to output commands and data to an external device.

Display component 410 may refer to, e.g., a solid state display that may have touch input capabilities. That is, display component 410 may include capabilities that may be shared with or replace those of input component 406.

Computer-readable medium 412 may refer to a separable machine-readable medium that is configured to store one or more programs that embody any of the functions or operations described above. That is, computer-readable medium 412, which may be received into or otherwise connected to a drive component of computing device 400, may store executable instructions to implement any of the functions or operations described above. These instructions may be complimentary or otherwise independent of those stored by memory 404.

Transceiver 414 may refer to a network communication link for computing device 400, configured as a wired network or direct-wired connection. Alternatively, transceiver 414 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed:

1. A non-transitory computer-readable medium storing executable instructions that, upon execution, cause a digital computing processor to compile source code to generate a quantum circuit by performing functions comprising:
   generating a function object ensemble;
   generating an abstract syntax tree from received source code, the source code being written in a Turing complete quantum programming language; and
   annotating nodes corresponding to the abstract syntax tree with each respective function object from the function object ensemble.

2. The computer-readable medium of claim 1, wherein the generating of the function object ensemble is executed before the source code is received.

3. The computer-readable medium of claim 1, wherein function objects included in the function object ensemble are functions written in a same language as the executable instructions.

4. The computer-readable medium of claim 1, wherein the generating includes loading function objects into memory.

5. The computer-readable medium of claim 4, wherein the annotating includes annotating respective nodes corresponding to the abstract syntax tree with corresponding function objects loaded into memory.

6. The computer-readable medium of claim 5, wherein a root node of the abstract syntax tree is executable to recursively execute child nodes thereof.

7. The computer-readable medium of claim 5, wherein a sequence of an execution of the annotated nodes is variable.

8. A digital processor, comprising:
a compiler to:
load into memory function objects corresponding, respectively, to all potential nodes of a parse tree,
receive source code, the source code being written in a Turing complete quantum programming language,
generate a parse tree from the received source code, and
annotate nodes of the generated parse tree with corresponding function objects loaded into the memory; and
a runtime to execute the annotated nodes of the parse tree.

9. The digital processor of claim 8, wherein the compiler is to generate respective nodes of the parse tree based on each statement included in the received source code.

10. The digital processor of claim 8, wherein the compiler is to annotate nodes of the generated parse tree by:
performing a type-check each node of the generated parse tree, and
binding respective function objects loaded into the memory to a corresponding node of the parse tree, in accordance with results of the type-check.

11. A compiling method, comprising:
loading function objects into memory;
receiving source code, the source code being written in a Turing complete quantum programming language;
loading compiler plugins;
generating a parse tree based on each statement included in the received source code;
resolving each statement included in the received source code;
hoisting the source code; and
annotating the generated parse tree by binding respective function objects loaded into the memory to a corresponding node of the parse tree, in accordance with results of a type-check.

12. The method of claim 11, wherein the source code is received as a text string.

13. The method of claim 11, wherein the resolving of imported statements is a recursive operation.

14. The method of claim 13, wherein the resolving of imported statements includes compiling nested programs.

15. The method of claim 11, wherein the hoisting includes:
resolving function declarations, and
resolving compile time constraints.

16. The method of claim 11, wherein the annotating includes:
performing a type-check each node of the generated parse tree, and
binding respective function objects loaded into the memory to a corresponding node of the parse tree, in accordance with results of the type-check.

17. The method of claim 16, wherein the function objects corresponding to the nodes of the parse tree are independently executed.

18. The method of claim 16, wherein the function objects corresponding to the nodes of the parse tree are executable in variable order.

* * * * *